INVENTOR.
Charles G. Robinson

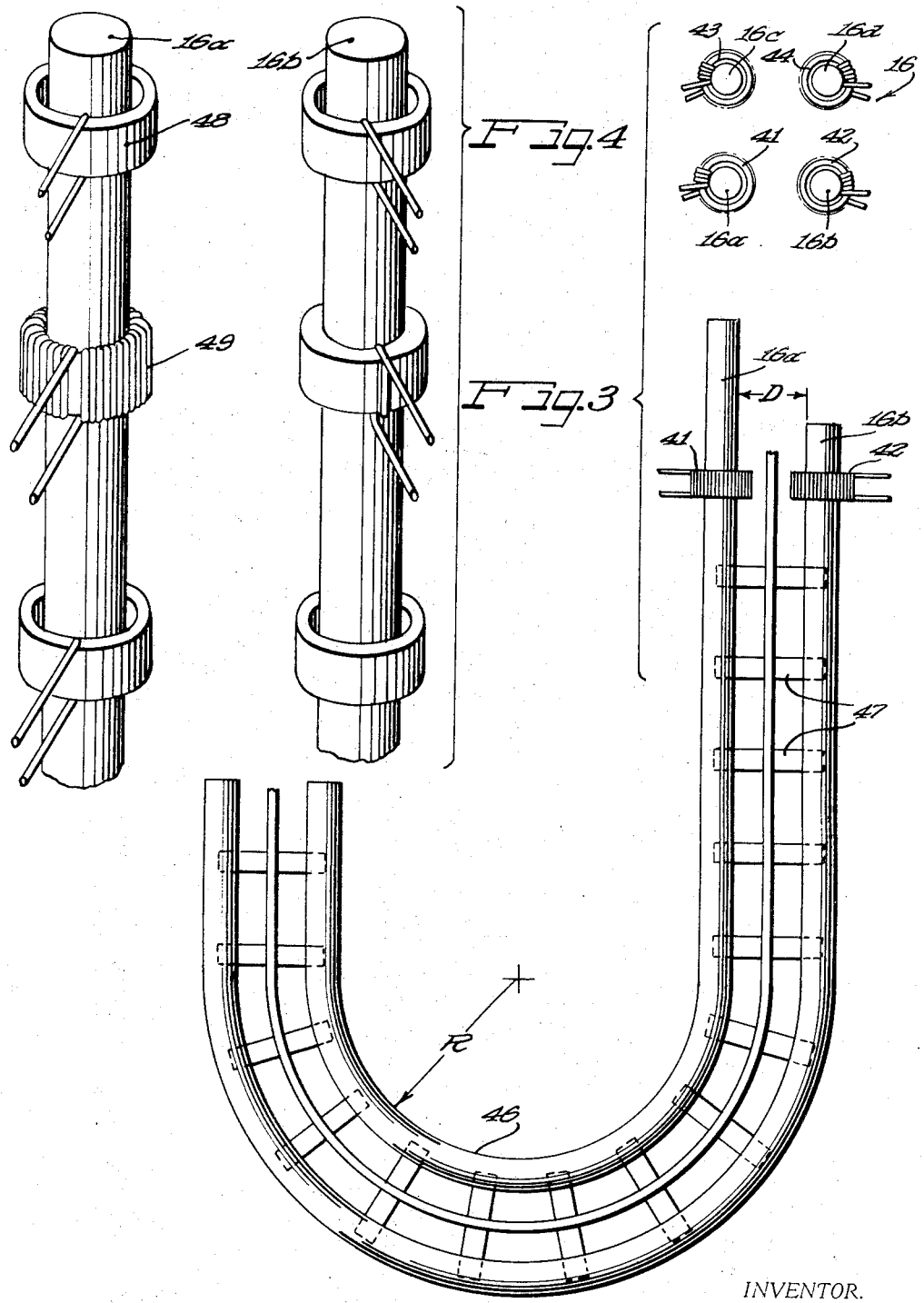

United States Patent Office  3,403,210
Patented Sept. 24, 1968

3,403,210
REDUCTION OF THE REACTANCE IN THE FLEXIBLE CABLES OF STEEL MELTING VESSELS
Charles G. Robinson, Sterling, Ill., assignor to Northwestern Steel and Wire Company, Sterling, Ill., a corporation of Illinois
Filed Jan. 25, 1967, Ser. No. 611,771
5 Claims. (Cl. 13—9)

ABSTRACT OF THE DISCLOSURE

An apparatus for reducing the reactance of a current delivery cable which is connected between a power source and an electrode of an electric arc furnace. The current delivery circuit includes a pair of cables connected between the power source and a single electrode of the furnace. One or more coils are associated with each of the pair of electrodes. Switch means are provided for connecting the coils in circuit with one another in response to sensing the wave-shape of the current delivered to the electrode of the furnace. The wave-shape is indicative of the amount of current. When the coils associated with the pair of cables are connected together the magnetic flux induced into the coils by the current of the cables produces a current flow within the coils which also produces a magnetic flux. The magnetic flux from the cable and from the coils co-act with one another in such a manner as to reduce the reactance of the cables connected to the electrode of the furnace.

---

This invention relates generally to electric arc furnaces and more particularly to a method and apparatus for reducing the reactance of current delivery conductors which are connected between a power source and an electrode of the furnace. Specifically, this invention is directed to a method and apparatus for trapping the radiated magnetic flux which is generated by the conductor, due to current passing therethrough, and converting the trapped flux to a current flow which can be used to induce a magnetic flux back into the conductor, thereby allowing the conductor to supply greater power to the furnace in a more efficient desirable manner than has heretofore been possible.

Electric arc furnaces for the production of steel from scrap have become relatively well known in the art. Such furnaces are commonly available in sizes up to 25,000 kv.-a. However, with the ever increasing need for reducing the cost of steel, it is necessary to develop electric arc furnaces in sizes of 100,000 to 500,000 kv.-a. In such large furnaces, down time for any reason is quite expensive. In practice, such furnaces usually have three electrodes which are included in a 3 phase power supply system. Each of the electrodes may be provided with an electrode position regulator to maintain equal arc power consumption between the electrodes by varying the position of the electrode and hence varying the arc length or electrical resistance of the circuit.

It has been found that as a practical matter, two alternatives are available based on previously known techniques. In the past, it has been necessary to choose between increased consumption of the electrode or increased down time due to the refractory material in the furnace burning. Using previously known power cable arrangements, when all of the electrodes are operated at the same distance with respect to the melt, a current unbalance exists such that one electrode operates at a much higher current than the other two electrodes. This arises primarily from an impedance unbalance between the three phases in the flat power cable arrangement. Undesirable down time occurs as an indirect result of this. Heretofore, in order to equalize the current between the phases, the electrode with the higher current is moved away from the melt until the current passing therethrough is equal to the current passing through the other two electrodes. The increased arc length which exposes the refractory lining of the furnace to the intense heat of the arc and causes the lining to be burned away at an excessive rate. This burning away of the refractory material causes undesirable down time. As a practical matter, it has frequently been decided in the past that operation with the occurrence unbalanced was less expensive than the down time caused by the burning away of the refractory material. However, such unbalanced operation results in a substantial increase in carbon consumption in the electrode carrying the high current.

During recent years the electric arc furnace has found increasing use in the steel industry because of the high concentration of the heat combined with highly efficient energy utilization, easy regulation and operation, flexibility, and contamination free melting and refining. In view of these advantages, the present trend is toward larger and more efficient furnaces wherein any down time of the type discussed above would become an increasingly expensive situation.

As is well known, such electric arc furnaces consist usually of a large cylindrical housing having a refractory lining and being provided with a set of three movable carbon or graphite electrodes which can be adjusted in height with respect to the top surface of the scrap being melted within the furnace. Power is supplied to the electrodes through flexible cables which usually extend from the top of the electrodes to connecting means normally mounted adjacent the furnace on a brick or other wall of the building in which the furnace is housed. The wall mounted connecting means in turn are connected through the wall to a power transformer which may be conveniently housed in a concrete housing outside the wall to afford explosion protection. The primary winding of the transformer may be connected to any suitable source of electrical power. The basic electrical circuit of the arc furnace therefor comprises a source of electrical power connected to the primary winding of a furnace transformer, the secondary winding of the furnace transformer being connected through flexible cables to the top of the movable electrodes.

The arc is initiated between the tips of the electrodes and the material which is to be melted, and the material serves as a common ground point in the circuit. As mentioned hereinabove, the circuit is usually of the three phase type. In such circuits, the arc resistance of each phase is variable, and has a magnitude determined by the position of the electrode with respect to the melt. The arc resistance can be zero, when the electrode is in contact with the melt, or the arc resistance can approach infinity, when the arc is extinguished. In general, the greater the distance of the electrode tip from the melt, the higher the resistance of the arc. The voltage drop across the arc may thus range from zero at short circuit conditions to the full voltage developed by the secondary of the transformer at open circuit conditions. The arc resistance and the impedance associated with the rest of the above outline circuit are connected in series with respect to one another and therefore act as a voltage divider network. Since it is desired to supply as much power as possible to the arc itself at a given voltage level, it is therefore desirable to reduce the circuit impedance as much as possible while maintaining the impedance of the three phases substantially the same with respect to one another for the reasons discussed above.

It will of course be realized that the power delivered is basically given by the product of the voltage level times the current, and that for a given voltage level higher current levels (which result from lower impedances) will afford greater power input to the arc. A minimum residual impedance in the current delivery circuit is necessary as a stabilizing element to prevent extremely high currents from passing through the circuit when short circuit conditions exist within the furnace. Without such minimum residual impedance, the power source would eventually be destroyed.

The exact value of the minimum necessary impedance will of course vary from one particular current delivery circuit to another, and will be determined by many factors extraneous to the present invention.

As noted above, the lack of symmetry between the three respective phases of the conventional three phase arc furnace has in the past resulted in a lack of current balance between the phases, thereby precluding operation of the furnace at maximum efficiency.

Therefore, one of the primary objects of the present invention is to provide a method and apparatus which will increase the efficiency of an electric arc furnace.

Another object of the present invention is to eliminate burning of the refractory lining within a furnace which is caused due to increased arc length.

Another object of the present invention is to provide a method of reducing the radiated flux from current delivery conductors which are connected between a power source and the electrodes of an electric arc furnace.

Still another object of the present invention is to provide means for continuously varying the impedance of the current delivery conductors of each phase of a three phase electric arc furnace so as to maintain a substantial balance between the phases.

Another object of the present invention is to provide means for varying the impedance of current delivery conductors of an electric arc furnace in accordance with a characteristic of the current passing through the conductors.

A feature of the present invention is the use of means for trapping the radiated magnetic flux from the current delivery conductors and converting the flux into a current flow which can be converted back into a magnetic flux which is induced into the current delivery conductor.

Briefly, the present invention is directed to a method of trapping a portion of the flux which is generated along a current conductor to develop the first current flow, and simultaneously trapping another portion of flux along a current conductor to develop a second current flow, and in combining the two current flow in such a manner as to cause the two currents to buck one another and a magnetic flux back into this conductor from which it originated. Furthermore, the present invention provides means for sensing a variable characteristic of the current passing through the current delivery conductor to control the amount of magnetic field bucking which is to be induced into the conductor. A phase angle control circuit and an electronic switching circuit are connected to a plurality of coils which are placed in proximity with the conductor to control the phase angle at which current passing through the coils is induced back into the conductor thereby providing means for varying the reactance of the conductor.

Other objects and features will be more fully realized and understood from the following detailed description when taken in conjunction with the accompanying drawing in which like reference numerals throughout the various views of the drawings are intended to designate similar elements or components and wherein:

FIGURE 3 shows a detailed construction of the current delivery conductors and of the coils positioned about the conductors to trap the magnetic flux radiated thereby; and FIGURE 4 is an enlarged fragmentary view of the conductors of FIGURE 3 showing a multiplicity of coils associated with each conductor.

Figure 1:
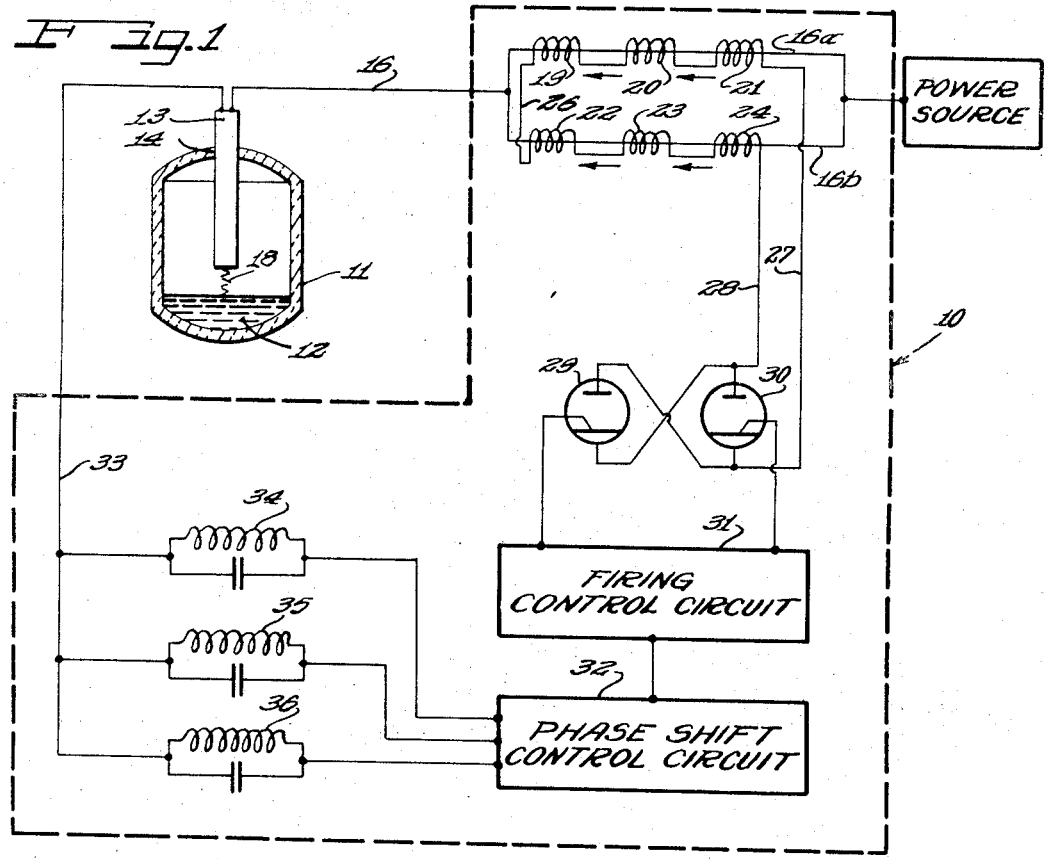
FIGURE 1 is a circuit diagram illustrating schematically the preferred circuit connections of the apparatus of the present invention.

Seen in FIGURE 1 is an illustrative embodiment of a reactance control circuit which is constructed in accordance with the principles of this invention, and is designated generally by reference numeral 10. The reactance control circuit 10 is associated with an electric arc furnace 11 which receives a charge of material to be melted. The charge is heated by high density current flow to produce a melt 12 at the bottom of the furnace. The top or roof portion of the furnace 11 is provided with an opening 14 for receiving an electrode 13. A cooling ring may be positioned about the electrode 13 in the vicinity of the opening 14 so as to prevent the hot gases escaping through the opening 14 from burning the upper portion of the roof of the furnace. Although only one electrode is shown in the illustrated embodiment, it will be understood that three electrodes may be positioned within the furnace, and the current delivery conductors associated with each electrode is provided with a reactance control circuit similar to that of the reactance control circuit 10.

A current delivery conductor 16 is connected to the electrode 13 to deliver high density current to the electrode from a power source 17. During the melt-down operation of the furnace, an arc 18 is established between the electrode 13 and the melt 12. It has been determined empirically that the current waveform of the current passing through the electrode 13 and the arc 18 has different wave shapes at different current values. Therefore, the present invention provides means for utilizing the different waveform characteristics of the current wave passing through the electrode 13 and arc 18 to provide automatic reactance control of the current delivery circuit between the electrode 13 and the power source 17.

The conductor 16 consists of a multiplicity of pairs of conductors. One such pair of conductors is indicated by reference numerals 16a and 16b. A plurality of coils 19, 20 and 21 are positioned in proximity with the conductor 16a, and a plurality of coils 22, 23 and 24 are positioned in proximity with the conductor 16b. In the illustrated embodiment, the coils 19–24 are connected in series. However, it will be understood that the coils 19–24 may be connected in parallel, or in any desired series parallel or parallel series combination. The coils 19 and 22 are connected together by a lead 26 while the coils 21 and 24 are provided with leads 27 and 28 respectively.

It is well known that current passing through a conductor will cause a magnetic field to be created about the conductor, and that the magnitude of the magnetic field is proportional to the amount of current flow passing through the conductor. Therefore, the coils 19–24 which are placed in proximity with the conductors 16a and 16b may be considered a secondary winding of a transformer, with the primary winding being formed by the conductors 16a and 16b.

The coils 19–24 are connected to one another in opposite polarity so that the current induced in the group of coils 19–21 is opposite in direction from the current induced in the coils 22–24. Therefore, by connecting the leads 27 and 28 together to create a short circuit between the two groups of coils, the current flow through the coils will be bucked out. This action will cause the magnetic flux which is induced into one group of coils by its associated conductor to be induced into the other conductor by the other group of coils, thereby reducing the total combined reactance of the conductors 16a and 16b.

To connect the leads 27 and 28 together, a pair of ignitrons 29 and 30 are connected in parallel and in opposite conductive directions so as to allow current to flow through the coils in both directions corresponding to the full wave AC current supplied by the power sources 17. The control electrodes of the ignitrons 29 and 30 are connected to a firing control circuit 31 which, in turn, is connected to a phase shift control circuit 32.

A line 33 is connected to the line 16 at the junction of the electrode 13. The other end of the line 33 is connected to the phase shift control circuit 32 via a plurality of inductance capacitance circuits 34, 35 and 36. The LC circuits 34–36 are resonant at different frequencies so as to pass current through different ones of the LC circuits to control the operation of the phase shift control circuit 32. For example, the LC circuit 34 may be resonant to the fundamental frequency and the first harmonics of the AC current waveform, and the LC circuit 35 may be resonant to the fundamental frequency less the harmonics thereof, and the LC circuit 36 may be resonant to the fundamental frequency and the second and higher harmonics of the AC current waveform.

Figure 2:
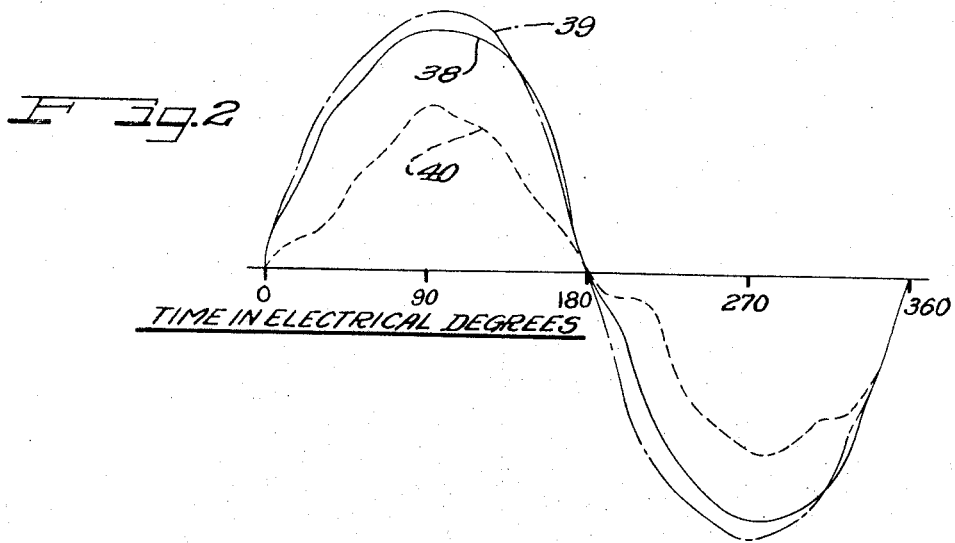
FIGURE 2 is a chart indicating the waveforms of the current delivered to the electrode of FIGURE 1 when the electrode is positioned from the melt at various distances.

Referring to FIGURE 2, it has been determined that current waveforms for different current amplitudes exhibit different waveform characteristics which correspond to the fundamental frequency and certain ones of the harmonics associated therewith. For example, the waveform 39 indicates the wave shape of the current at high current values, and almost exactly conforms to the waveform of a pure sinusoidal wave. Therefore, when current is delivered to the electrode 13 having a current waveform similar to that of the waveform 39, the LC circuit 34 will pass a portion of this waveform to the phase shift control circuit 32 to advance the firing angle of the firing control circuit 31 thereby adding additional impedance to the current delivery conductor 16 by rendering the ignitron 29 or 30 conductive later in the cycle and connecting the coils 19–24 together for a shorter period of time of each cycle.

However, should the current delivered to the electrode 13 have a waveform similar to the waveform 38, of FIGURE 2, the waveform will be delivered to the phase shift control circuit 32 via the LC circuit 35 which will retard the firing angle of the firing control circuit 31, thereby reducing the average period of time which the ignitrons 29 and 30 are conductive to increase the effective reactance of the current delivery conductor 16. On the other hand, should the current delivered to the electrode 13 decrease, the waveform of the current will resemble the waveform 40 of FIGURE 2. This waveform is delivered to the phase shift control circuit 32 via the LC circuit 36 to further retard the firing angle of the firing control circuit 31.

Therefore, the reactance control circuit of the present invention provides means for automatically varying the impedance of the current delivery conductor 16 depending upon the amount of current passing through the conductor. This feature eliminates the necessity of varying the position of the electrodes relative to the melt which often results in damage to the refractory lining of the furnace.

Seen in FIGURE 3 is the detailed construction of the current delivery conductor 16 which includes the conductors 16a, 16b, 16c and 16d. In this embodiment, a single toroid coil is positioned about each of the conductors 16a–16d so as to receive the magnetic flux generated by the current passing through each of the conductors. As mentioned hereinabove, the conductors are grouped in pairs so that the coils associated with one pair of conductors may be controlled by a reactance control circuit similar to that of FIGURE 10 and the coils associated with the other pair of conductors may be controlled by a different but similar reactance control circuit. For example, a toroid coil 41 is positioned on the conductor 16a and a toroid coil 42 is positioned on the conductor 16b, and the two toroid coils 41 and 42 may be connected together by a reactance control circuit. Similarly, a toroid coil 43 is positioned about the conductors 16c and a toroid coil 44 is positioned about the conductor 16d and the coils 43 and 44 may be connected together by a reactance control circuit. Also, it will be understood that all of the coils 41–44 may be connected together by a single reactance control circuit.

The number and position of the coils of each of the conductors depends upon a number of different variable characteristics of the current delivery conductors. For example, the radius R of the bend 46 in the conductor 16 causes a certain amount of reactance to be present in the conductor. Therefore, the greater the reactance of the conductors the greater the number of coils used.

Also a determined factor of the number of coils used is the distance between the respective conductors in a given group. That is, by varying the distance D between the conductor 16a and 16b, a variation in reactance will occur. To maintain the distance D at a constant value after the conductors have been connected to the furnace, the conductors are separated by a plurality of spacers 47 which are constructed of insulated material.

Furthermore, it will be understood that the radius R and the distance D may be selected to cause the conductors 16a–16d to have a predetermined amount of reactance at maximum current flow (short circuit) so as to prevent damage to the power source 17.

Referring to FIGURE 4, the conductors 16a and 16b may be provided with a plurality of toroid coils. For purposes of illustration, the toroid coils shown in FIGURE 4 are shown in various states of assembly. The laminated ring core of each of the toroid coils is indicated by reference numeral 48 and is wound with a tubular or hollow insulated conductor 49. Therefore, a cooling fluid such as water may be passed through the conductor 49 to prevent overheating of the toroid coil.

Therefore, the present invention has provided means for automatically varying the reactance of current delivery conductors which are connected between a power source and an electrode of an electric arc furnace.

It will be understood that variations and modifications may be effected without departing from the spirit and scope of the novel concepts of this invention.

I claim as my invention:

1. An apparatus for reducing the reactance of a pair of flexible current delivery cables which are connected between a power source and a single electrode in an electric arc furnace comprising:

at least one toroid coil positioned about each of said pair of cables at a location on said cable between said power source and said single electrode for receiving magnetic flux from said cables during periods when current is delivered to said single electrode; and means responsive to the current passing through said single electrode for connecting the coils on one of said pair of cables to the coils on the other of said pair of cables to produce a current flow in said coils in response to the magnetic flux of said pair of cables, whereby, the current passing through said coils will produce a magnetic flux which will co-act with the magnetic flux produced from said cables to reduce the reactance of said cables.

2. The apparatus of claim 1 where said means includes; a waveform detector connected to said single electrode of the arc furnace for sensing different current waveforms which correspond to different current values passing through the electrode, and switch means operated by said waveform detector to selectively connect the coils on one of said cables to the coils on the other of said cables.

3. The apparatus of claim 1 wherein said toroid coil is constructed of a tubular conductor which is wound about a laminated circular core, and fluid delivery means for passing a cooling fluid through said tubular conductor of said coil.

4. The apparatus of claim 1 wherein said means includes electronic switch means for connecting the coils on one of said cables to the coils on the other of said cables at a predetermined phase angle with respect to the current passing through said cables, said phase angle depending upon the amount of current passing through said cables and said single electrode.

5. The apparatus of claim 4 further including phase shift means connected between said cables and said electronic switch means for controlling the phase at which said switch means is actuated.

References Cited
UNITED STATES PATENTS

| | | | |
|---|---|---|---|
| 1,242,971 | 10/1917 | Peters | 13—12 |
| 2,362,569 | 11/1944 | Lobosco | 314—71 |
| 2,794,142 | 5/1957 | Steele | 314—71 |
| 3,229,186 | 1/1966 | Lafuze | 323—89 |

OTHER REFERENCES

Journal of the American Welding Society, October, 1932, pp. 5–9, N.Y., "Influence of a Magnetic Field Parallel to the Iron Arc on Welding."

BERNARD A. GILHEANY, *Primary Examiner.*

H. B. GILSON, *Assistant Examiner.*